United States Patent
Xu

(10) Patent No.: US 8,374,013 B2
(45) Date of Patent: Feb. 12, 2013

(54) POWER SUPPLY WITH AN INTERFACE FOR AC AND DC SIGNALS

(75) Inventor: Jianhua Xu, Shenzhen (CN)

(73) Assignee: Shenzhen LVSUN Technology Co., Ltd., Shenzhen (CN)

( * ) Notice: Subject to any disclaimer, the term of this patent is extended or adjusted under 35 U.S.C. 154(b) by 478 days.

(21) Appl. No.: 12/690,116

(22) Filed: Jan. 20, 2010

(65) Prior Publication Data

US 2011/0176344 A1    Jul. 21, 2011

(51) Int. Cl.
*H02M 11/00*    (2006.01)

(52) U.S. Cl. ............................ 363/142; 307/72; 363/123

(58) Field of Classification Search .................. 363/142, 363/123, 65, 143; 307/72, 22, 75
See application file for complete search history.

(56) References Cited

U.S. PATENT DOCUMENTS

| | | | | |
|---|---|---|---|---|
| 4,185,315 A * | 1/1980 | Miller | ............................ | 361/205 |
| 4,608,498 A * | 8/1986 | Falzarano et al. | ................ | 307/22 |
| 5,327,016 A * | 7/1994 | Su et al. | ......................... | 307/128 |
| 5,640,076 A * | 6/1997 | Youn | .............................. | 320/138 |
| 6,678,181 B2 * | 1/2004 | Karol et al. | .................... | 363/141 |
| 7,190,091 B1 * | 3/2007 | Marshall | .......................... | 307/26 |

FOREIGN PATENT DOCUMENTS

JP    2004357408 A    * 12/2004

\* cited by examiner

*Primary Examiner* — Harry Behm

(57) ABSTRACT

A power supply includes an AC-to-DC circuit, a DC-to-DC circuit, an interface used by both of the AC-to-DC circuit and the DC-to-DC circuit, and a control circuit for controlling the interface. The interface includes an ACL/DC+ input terminal, an ACN/DC− input terminal and a ground. The control circuit includes an AC/DC detecting circuit for determining whether an input voltage is AC or DC, an AC/DC converting circuit for selectively conducting AC or DC, and a conversion-controlling circuit for controlling the direction of the input voltage based on the determination in the AC/DC detecting circuit.

8 Claims, 2 Drawing Sheets

US 8,374,013 B2
1

POWER SUPPLY WITH AN INTERFACE FOR AC AND DC SIGNALS

BACKGROUND OF INVENTION

1. Field of Invention

The present invention relates to power supplies and, more particularly, to a power supply with an interface for AC and DC signals.

2. Related Prior Art

AC/DC power supplies and DC/DC power supplies are commonly used in our everyday life. For convenience, there have been power supplies as combination of an AC/DC power supply with a DC/DC power supply. Because of difference in input signals, such a power supply uses separate AC-input and DC-input interfaces. Based on the type of the input signals, one of the interfaces is selected, and this is inconvenient, and negatively affects the look of such a power supply.

The present invention is therefore intended to obviate or at least alleviate the problems encountered in prior art.

SUMMARY OF INVENTION

It is the primary objective of the present invention to provide a power supply with an interface for AC and DC signals.

To achieve the foregoing objective, the power supply includes an AC-to-DC circuit, a DC-to-DC circuit, an interface used by both of the AC-to-DC circuit and the DC-to-DC circuit, and a control circuit for controlling the interface. The interface includes an ACL/DC+ input terminal, an ACN/DC− input terminal and a ground. The control circuit includes an AC/DC detecting circuit for determining whether an input voltage is AC or DC, an AC/DC converting circuit for selectively conducting AC or DC, and a conversion-controlling circuit for controlling the direction of the input voltage based on the determination in the AC/DC detecting circuit.

Other objectives, advantages and features of the present invention will become apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
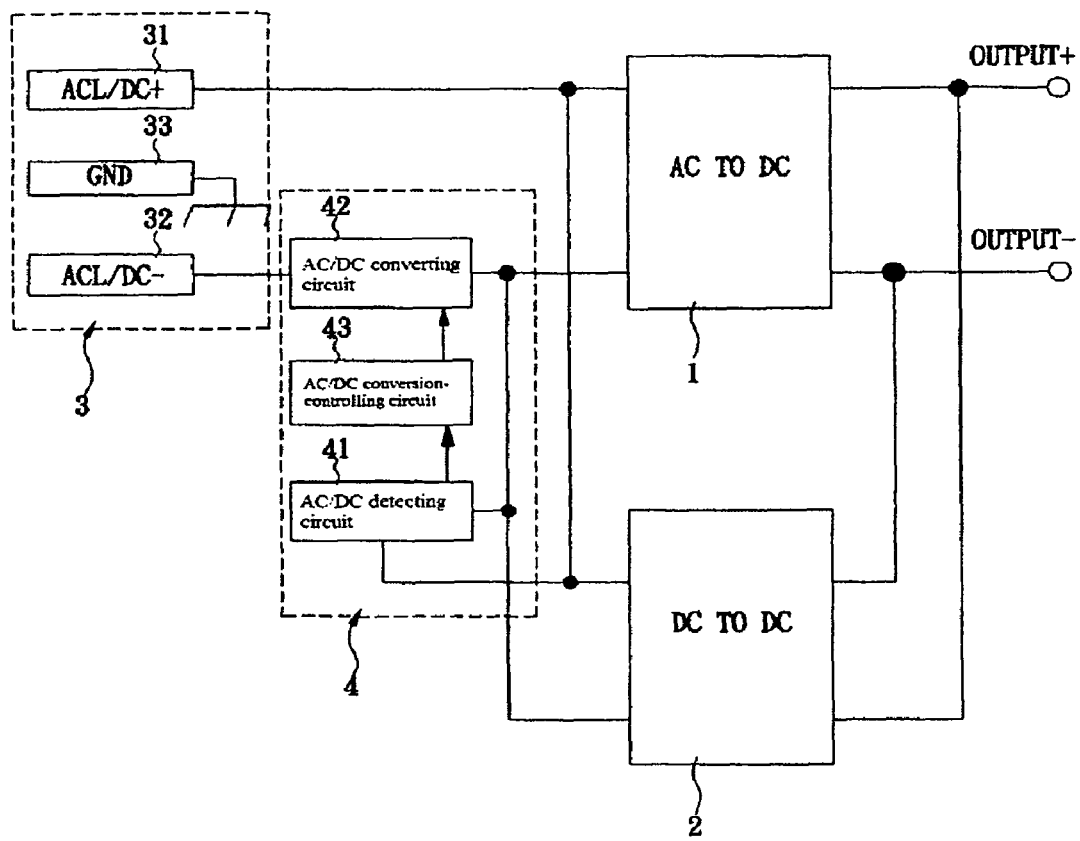
FIG. 1 is a block diagram of an interface for AC and DC signals according to the preferred embodiment of the present invention.

Referring to FIG. 1, a power supply includes an AC-to-DC circuit 1, a DC-to-DC circuit 2 and a single interface 3 for both of the AC-to-DC circuit 1 and the DC-to-DC circuit 2 according to the preferred embodiment of the present invention. The interface 3 consists of an ACL/DC+ input terminal 31, an ACN/DC− input terminal 32 and a ground 33. The operation of the interface 3 is under the control of a control circuit 4. The control circuit 4 includes an AC/DC detecting circuit 41, an AC/DC converting circuit 42 and an AC/DC conversion-controlling circuit 43. The AC/DC detecting circuit 41 determines whether an input voltage is AC or DC. The AC/DC converting circuit 42 selectively conducts AC or DC.

The conversion-controlling circuit 43 controls the direction of the input voltage based on the determination in the AC/DC detecting circuit 41.

Figure 2:
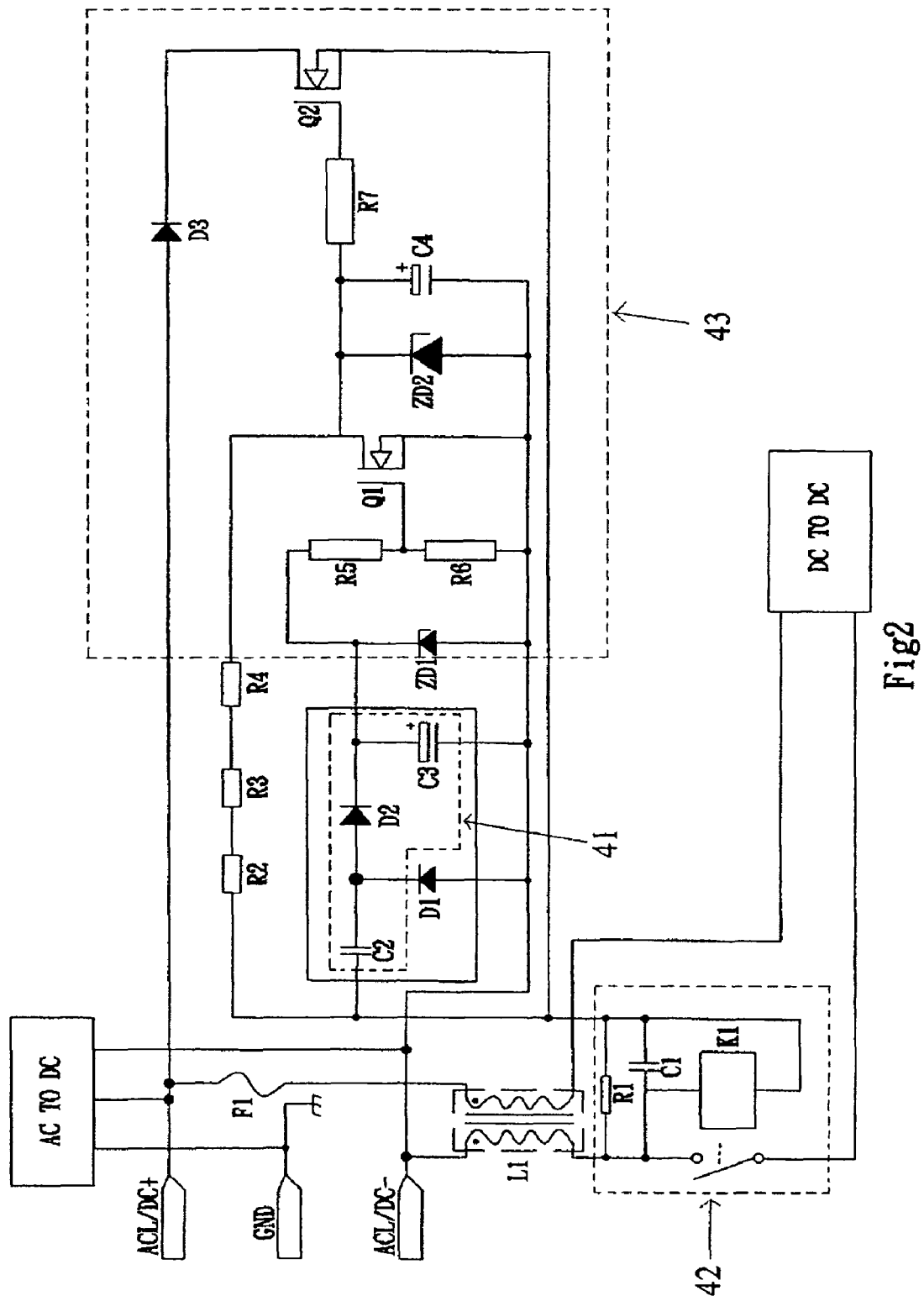
FIG. 2 is a circuit diagram of the interface shown in FIG. 1.

Referring to FIG. 2, the AC/DC converting circuit 42 includes a capacitor C1, a relay K1 and a resistor R1. A terminal of the capacitor C1 is connected to the ACN/DC− input terminal 32 via an inductor. Another terminal of the capacitor C1 is connected to a positive input pin of the relay K1 via an inductor. The relay K1 includes two normally-on pins. One of the normally-on pins is connected to the ACN/DC− input terminal 32 via an inductor. The other normally-on pin is connected to the DC-to-DC circuit 2. The resistor R1 is connected in parallel to two ends of the capacitor C1.

The AC/DC detecting circuit 41 includes a capacitor C2, a diode D2 and an electrolytic capacitor C3. A terminal of the capacitor C2 is connected to the positive input pin of the relay K1 of the AC/DC converting circuit 42. Another terminal of the capacitor C2 is connected to a positive electrode of the diode D2. A negative electrode of the diode D2 is connected to a positive electrode of the electrolytic capacitor C3. A negative electrode of the electrolytic capacitor C3 is connected to the ACN/DC− input terminal 32.

The AC/DC conversion-controlling circuit 43 includes resistors R5, R6 and R7, fetrons Q1 and Q2 and a diode D3. A terminal of the resistor R5 is connected to the negative electrode of the diode D2 of the AC/DC detecting circuit 41. Another terminal of the resistor R5 is connected to the gate of the fetron Q1. The gate of the fetron Q1 is further connected in serial to the ACN/DC− input terminal 32 via the resistor R6. The source of the fetron Q1 is connected to the ACN/DC− input terminal 32. The drain of the fetron Q1 is connected to the positive input pin of the relay K1 via a current-limiting resistor. A terminal of the resistor R7 is connected to the drain of the fetron Q1. Another terminal of the resistor R7 is connected to gate of the fetron Q2. The drain of the fetron Q2 is connected to a negative electrode of the diode D3. A positive electrode of the diode D3 is connected to the ACL/DC+ input terminal 31. The source of the fetron Q2 is connected to the positive input pin of the relay K1.

The current-limiting resistor includes three resistors R2, R3 and R4 connected in serial to one another. The AC/DC conversion-controlling circuit 43 includes a Zener diode ZD1. A negative electrode of the Zener diode ZD1 is connected to the negative electrode of the diode D2. A positive electrode of the Zener diode ZD1 is connected to the ACN/DC− input terminal 32.

The AC/DC conversion-controlling circuit 43 further includes a Zener diode ZD2. A positive electrode of the Zener diode ZD2 is connected to the drain of the fetron Q1. A negative electrode of the Zener diode ZD2 is connected to the ACN/DC− input terminal 32.

The AC/DC conversion-controlling circuit 43 further includes a capacitor C4. A positive electrode of the capacitor C4 is connected to the drain of the fetron Q1. A negative electrode of the capacitor C4 is connected to the ACN/DC− input terminal 32.

When AC is transferred to the interface 3, the AC/DC detecting circuit 41 operates. The AC goes through the capacitor C2, the diodes D2 and D1 and the electrolytic capacitor C3, and goes under a voltage-reducing, rectifying and filtering process and therefore is converted into a DC signal. The DC signal goes through the potential-dividing resistors R5 and R6 and loaded onto the gate G of the fetron Q1. The fetron Q1 is turned on immediately, and the voltage at the drain D of the fetron Q1 becomes 0 V. The voltage at the gate G of the fetron Q2 is also 0 V. The fetron Q2 is off. No voltage is transferred to the positive input pin of the relay K1.

The normally-on pins of the relay K1 are not connected to each other. The DC-to-DC circuit 2 is interrupted. The AC cannot be loaded onto the DC-to-DC circuit 2. Only the AC-to-DC circuit 1 operates. The DC-to-DC circuit 2 is made idle and protected.

When DC is transferred to the interface 3, the DC cannot be loaded onto the control circuit 4 because the capacitor C2 blocks AC. There is no voltage at the gate G of the fetron Q1, and fetron Q1 is turned off. The gate G of the fetron Q2 is connected to the positive electrode of the input via the resistors R2, R3 and R4. Hence, the gate G of the fetron Q2 is at high voltage, and the fetron Q2 is turned on. The input voltage goes to the positive input pin of the relay K1 via the diode D3 and the fetron Q2. Thus, the normally-on pins of the relay K1 are connected to each other. The DC-to-DC circuit 2 operates.

As discussed above, the AC and DC are differentiated so that they can be processed with the single interface 3. The look of the power supply is neat and the use of the power supply is convenient.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A power supply comprising:
   an AC-to-DC circuit (1);
   a DC-to-DC circuit (2);
   an interface (3) used by both of the AC-to-DC circuit (1) and the DC-to-DC circuit (2), wherein the interface (3) includes an ACL/DC+ input terminal (31), an ACN/DC− input terminal (32) and a ground (33); and
   a control circuit (4) for controlling the interface (3), wherein the control circuit (4) includes an AC/DC detecting circuit (41) for determining whether an input voltage is AC or DC, an AC/DC converting circuit (42) for selectively conducting AC or DC, and an AC/DC conversion controlling circuit (43) for controlling the direction of the input voltage based on the determination in the AC/DC detecting circuit (41);
   said AC/DC converting circuit (42) includes:
   a capacitor (C1) formed with two terminals;
   a relay (K1) formed with a positive input pin and two normally-on pins; and
   a resistor (R1);
   wherein one of the terminals of the capacitor (C1) is connected to the ACN/DC− input terminal (32) via an inductor;
   wherein the other terminal of the capacitor (C1) is connected to the positive input pin of the relay (K1);
   wherein one of the normally-on pins of the relay (K1) is connected to the ACN/DC− input terminal (32) via the inductor;
   wherein the other normally-on pin of the relay (K1) is connected to the DC-to-DC circuit (2);
   wherein the resistor (R1) is connected in parallel to the capacitor (C1).

2. The power supply according to claim 1, wherein the AC/DC detecting circuit (41) includes:
   a capacitor (C2) formed with two terminals;
   a primary diode (D2) with positive and negative electrodes; and
   an electrolytic capacitor (C3) formed with positive and negative electrodes;
   wherein one of the terminals of the capacitor (C2) of the AC/DC detecting circuit (41) is connected to the positive input pin of the relay (K1);
   wherein the other terminal of the capacitor (C2) of the AC/DC detecting circuit (41) is connected to the positive electrode of the primary diode (D2);
   wherein the negative electrode of the primary diode (D2) is connected to the positive electrode of the electrolytic capacitor (C3);
   wherein the negative electrode of the electrolytic capacitor (C3) is connected to the ACN/DC− input terminal (32).

3. The power supply according to claim 1, further including a secondary diode (D1) formed with a negative electrode connected to the positive electrode of the primary diode (D2) and a positive electrode connected to the ACN/DC− input terminal (32).

4. The power supply according to claim 3, wherein the current-limiting resistor includes three resistors (R2, R3, R4) connected in serial to one another.

5. The power supply according to claim 3, wherein the AC/DC conversion-controlling circuit (43) further includes a Zener diode (ZD1) formed with a negative electrode connected to the negative electrode of the primary diode (D2) of the AC/DC detecting circuit (41) and a positive electrode connected to the ACN/DC− input terminal (32).

6. The power supply according to claim 3, wherein the AC/DC conversion-controlling circuit (43) further includes a Zener diode (ZD2) formed with a positive electrode connected to the drain of the first fetron (Q1) and a negative electrode connected to the ACN/DC− input terminal (32).

7. The power supply according to claim 3, wherein the AC/DC conversion-controlling circuit (43) further includes a capacitor (C4) formed with a positive electrode connected to the drain of the first fetron (Q1) and a negative electrode connected to the ACN/DC− input terminal (32).

8. The power supply according to claim 1 wherein the AC/DC conversion-controlling circuit (43) includes:
   a first resistor (R5) including two terminals;
   a second resistor (R6) including positive and negative electrodes;
   a third resistors (R7) including positive and negative electrodes;
   a first fetron (Q1) including a source, a gate and a drain; and
   a second fetron (Q2) including a source, a gate and a drain;
   a diode (D3); and
   a current-limiting resistor;
   wherein one of the terminals of the first resistor (R5) of the AC/DC conversion-controlling circuit (43) is connected to the negative electrode of the primary diode (D2) of the AC/DC detecting circuit (41);
   wherein the other terminal of the first resistor (R5) of the AC/DC conversion-controlling circuit (43) is connected to the gate of the first fetron (Q1);
   wherein the gate of the first fetron (Q1) is further connected in serial to the ACN/DC− input terminal (32) via the second resistor (R6) of the AC/DC conversion-controlling circuit (43);
   wherein the source of the first fetron (Q1) is connected to the ACN/DC− input terminal (32);
   wherein the drain of the first fetron (Q1) is connected to the positive input pin of the relay (K1) via the current-limiting resistor;
   wherein one of the terminals of the third resistor (R7) is connected to the drain of the first fetron (Q1);
   wherein the other terminal of the third resistor (R7) is connected to gate of the second fetron (Q2);

wherein the drain of the second fetron (Q2) is connected to the negative electrode of the diode (D3) of the AC/DC conversion-controlling circuit (43);

wherein the positive electrode of the diode (D3) of the AC/DC conversion-controlling circuit (43) is connected to the ACL/DC+ input terminal (31); and wherein the source of the second fetron (Q2) is connected to the positive input pin of the relay (K1).

* * * * *